United States Patent [19]

Nero

[11] 4,394,722

[45] Jul. 19, 1983

[54] TELEVISION RECEIVER HIGH VOLTAGE GENERATOR

[75] Inventor: Leroy W. Nero, Indianapolis, Ind.

[73] Assignee: RCA Corporation, New York, N.Y.

[21] Appl. No.: 297,791

[22] Filed: Aug. 31, 1981

[51] Int. Cl.$^3$ .......................... H02M 7/10; H04N 3/18
[52] U.S. Cl. ........................................ 363/68; 363/61; 315/411; 358/190
[58] Field of Search .................................... 363/59–61, 363/67, 68; 315/411; 358/190; 336/183, 184, 185

[56] References Cited

U.S. PATENT DOCUMENTS

| | | | |
|---|---|---|---|
| 2,356,558 | 8/1944 | Bähring | 175/363 |
| 2,439,223 | 4/1948 | Schade | 171/97 |
| 2,783,413 | 2/1957 | Smith | 315/16 |
| 3,243,683 | 3/1966 | Ackley | 321/2 |
| 3,316,475 | 4/1967 | Hayama et al. | 321/15 |
| 3,363,165 | 1/1968 | Wilkinson | 321/27 |
| 3,381,204 | 4/1968 | Cox | 321/15 |
| 3,484,866 | 12/1969 | Nakamura et al. | 321/15 |
| 3,539,903 | 11/1970 | Goebel | 321/15 |
| 3,541,424 | 11/1970 | Tada et al. | 321/8 |
| 3,617,854 | 11/1971 | Cole | 321/15 |
| 3,723,846 | 3/1973 | Thompson, Jr. | 321/15 |
| 3,828,239 | 8/1974 | Nagai et al. | 321/2 |
| 3,886,434 | 5/1975 | Schreiner | 363/68 |
| 3,936,719 | 2/1976 | Miyoshi et al. | 363/68 X |
| 4,144,480 | 3/1979 | Nagasaki et al. | 315/411 |
| 4,274,136 | 6/1981 | Onodera et al. | 363/68 |

OTHER PUBLICATIONS

SCR Manual 5th Edition, by D. R. Grafham, 1972, pp. 150, 151.
E. Norman Lurch, "Fundamentals of Electronics", 1971, John Wiley & Sons, Inc., pp. 175–178.

Primary Examiner—William M. Shoop
Assistant Examiner—Peter S. Wong
Attorney, Agent, or Firm—E. M. Whitacre; P. J. Rasmussen; Joseph Laks

[57] ABSTRACT

In a television receiver having a picture tube that requires an ultor accelerating potential and an intermediate direct voltage, such as a focus voltage, a high voltage generator is provided that develops the two voltages. A source of alternating voltage is coupled to a primary winding of a transformer for developing an alternating polarity voltage across each of two high voltage secondary windings. A first voltage doubler is coupled to the first high voltage winding for rectifying the alternating polarity voltage developed across the winding during both polarity intervals thereof to produce a first direct voltage. The first direct voltage is applied to an intermediate voltage terminal to generate the picture tube intermediate direct voltage between that terminal and a reference terminal. A second voltage doubler is coupled to the second high voltage winding for rectifying the alternating polarity voltage developed across the winding during both polarity intervals thereof to produce a second direct voltage. The first and second direct voltages are combined and applied to an ultor terminal to generate the picture tube ultor accelerating potential between this terminal and the reference terminal.

17 Claims, 5 Drawing Figures

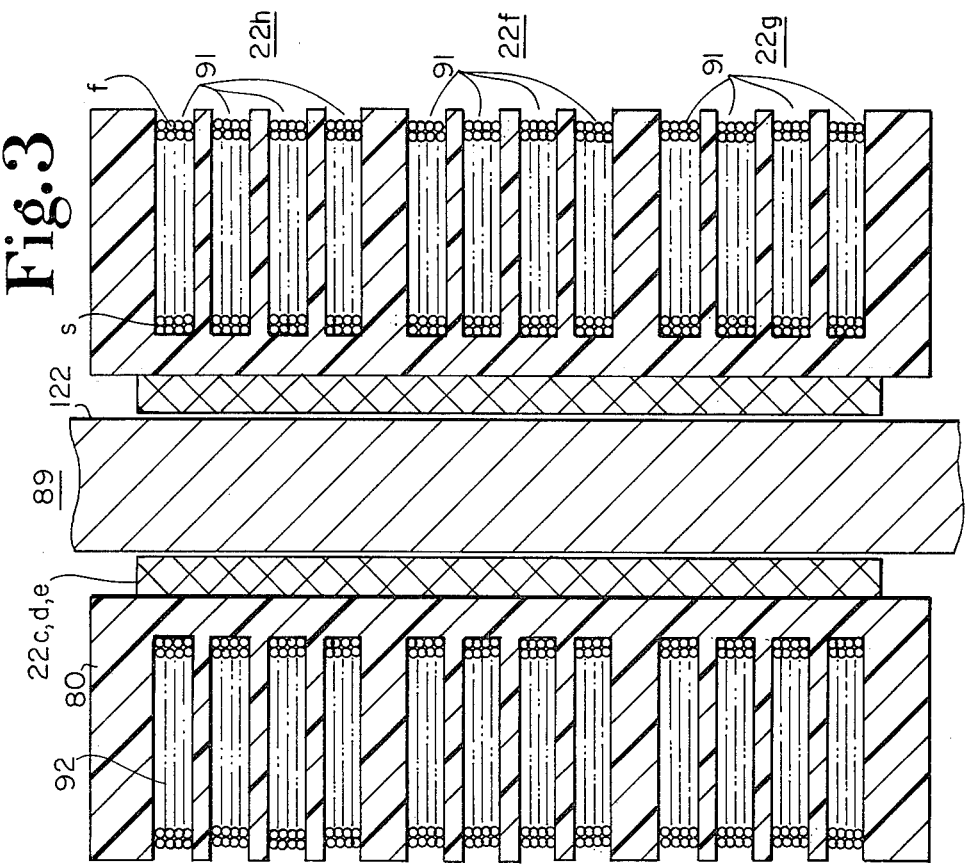
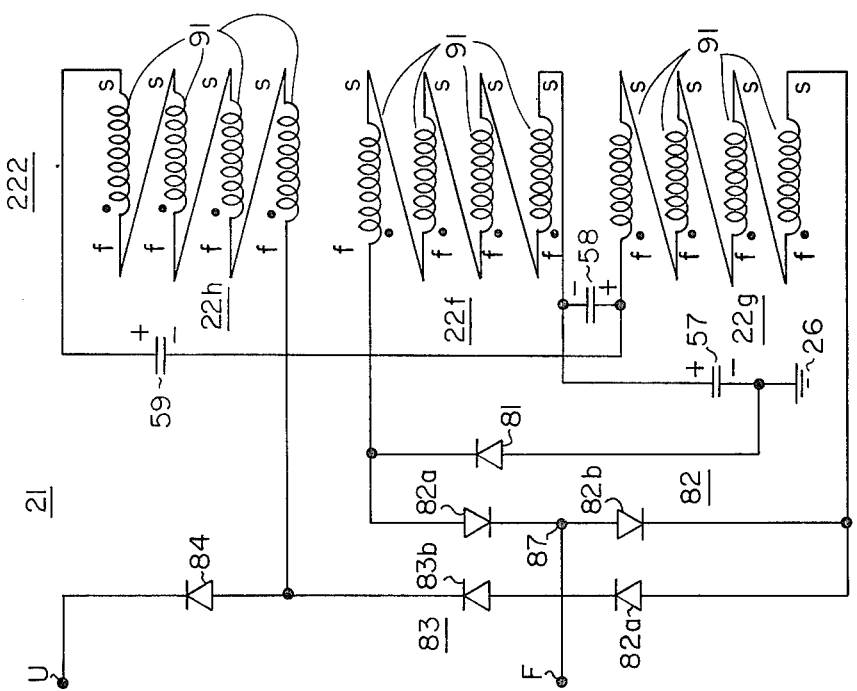

TELEVISION RECEIVER HIGH VOLTAGE GENERATOR

This invention relates to a high voltage generator for a television display system.

In a television receiver, a high voltage generator develops several direct voltages for the electrodes of the television receiver picture tube. The high voltage generator develops an ultor accelerating potential for the final anode electrode of the picture tube and also develops an intermediate high voltage for the focus electrode. For many types of picture tubes, the value of the focus voltage is approximately one third that of the ultor accelerating potential. The focus voltage should track changes in the ultor accelerating potential to prevent spot defocusing of the electron beams.

The high voltage generator may include a source of alternating polarity voltage coupled to the primary winding of a power transformer. A rectifier-capacitor arrangement is then coupled to a high voltage tertiary winding of the power transformer to develop the ultor accelerating potential.

When the power transformer of the high voltage generator is a flyback transformer having a primary winding coupled to the television receiver horizontal deflection circuit, the alternating polarity voltage developed across the high voltage tertiary winding is an asymmetrical duty cycle voltage, with a relatively large amplitude pulse voltage of a given polarity being developed during a relatively short retrace interval and with a small amplitude voltage being developed during the relatively long duration opposite polarity, trace interval. When the power transformer develops such a relatively asymmetrical high voltage waveform, a half-wave rectifier coupled to the picture tube ultor filter capacitance may be advantageously used to rectify only the large amplitude retrace pulse voltage.

When the source of alternating polarity voltage that is coupled to the power transformer primary winding is a fifty percent duty cycle voltage, such as produced by a square-wave inverter, the voltage waveform developed across the high voltage tertiary winding is also a fifty percent duty cycle waveform with the positive polarity amplitudes being substantially equal to the negative polarity amplitudes. It may be undesirable to use a half-wave rectifier arrangement to provide the ultor accelerating potential because of the relatively large number of tertiary turns that may be required in order to produce a relatively large magnitude ultor accelerating potential.

Compare, for example, a flyback transformer system to a square-wave inverter power transformer system that develops the same volts per tertiary winding turn, of illustratively 8 volts per turn. In the flyback transformer system, each turn during the retrace interval develops approximately 7 volts. To generate 28 kilovolts as an ultor accelerating potential when using a half-wave rectifier arrangement, approximately 4,000 tertiary turns are required.

In the square-wave inverter power transformer system, each tertiary winding turn develops only 4 volts during a given polarity interval. When a half-wave rectifier arrangement is used, a relatively large number of tertiary winding turns are required, approximately 7,000 turns, to develop the 28 kilovolt ultor accelerating potential.

When a square-wave inverter is used to excite the power transformer primary winding, some high voltage generators may include a cascade multiplier rectifier arrangement coupled to the high voltage tertiary winding. With, for example, 10 volts per turn, peak to peak, being developed, a sextupler coupled to a 1,000 turn high voltage tertiary winding may be used to develop a 30 kilovolt ultor accelerating potential. Use of a sextupler has the relative disadvantage of requiring a relatively large number, five to six, for example, of high voltage rated capacitors in addition to the six rectifiers that are required. Furthermore, when the sextupler rectifier and capacitor elements are to be integrally molded with the high voltage tertiary winding into one assembly, the size of the assembly may be inordinately large.

A feature of the invention is a high voltage generator design that is especially useful in combination with a square-wave inverter. The primary winding of a power transformer is coupled to a source of alternating voltage for developing an alternating polarity voltage across each of two high voltage secondary windings. A first voltage doubler is coupled to a first one of the high voltage windings for rectifying the alternating polarity voltage developed across the winding during both polarity intervals thereof to produce a first direct voltage. A second voltage doubler is coupled to the second high voltage winding for rectifying the alternating polarity voltage developed across the winding during both polarity intervals thereof to produce a second direct voltage. The first and second direct voltages are combined and applied to the ultor terminal to generate the picture tube ultor accelerating potential between an ultor terminal and a reference terminal.

Another feature of the invention is a high voltage generator design that uses two doublers wherein the output of the first voltage doubler generates a focus voltage and wherein the output of the second voltage doubler is added to the output of the first voltage doubler to provide an ultor accelerating potential having a magnitude that is approximately three times that of the focus voltage. The high voltage secondary winding that is coupled to the second voltage doubler is formed into two winding sections, with each winding section having approximately the same number of turns as that of the high voltage winding that is coupled to the first voltage doubler. Thus, the output of the second voltage doubler is twice that of the first voltage doubler and when added thereto produces an ultor accelerating potential that is three times the magnitude of the focus voltage.

Still another feature of the invention is the arrangement of the first high voltage seconary winding and the two sections of the second high voltage secondary winding on a common leg of the magnetizable core of the power transformer such that the first high voltage secondary winding is interposed between the two sections of the second high voltage secondary winding. Using such an arrangement, the AC voltage stress between end terminals of two adjacent winding units may be made relatively low.

FIG. 3 illustrates in cross-section the construction of a high voltage assembly that includes the tertiary winding unit of FIG. 1;

FIG. 4 illustrates an alternate layout or arrangement of the elements of the electrical circuit of FIG. 2.

Figure 1:
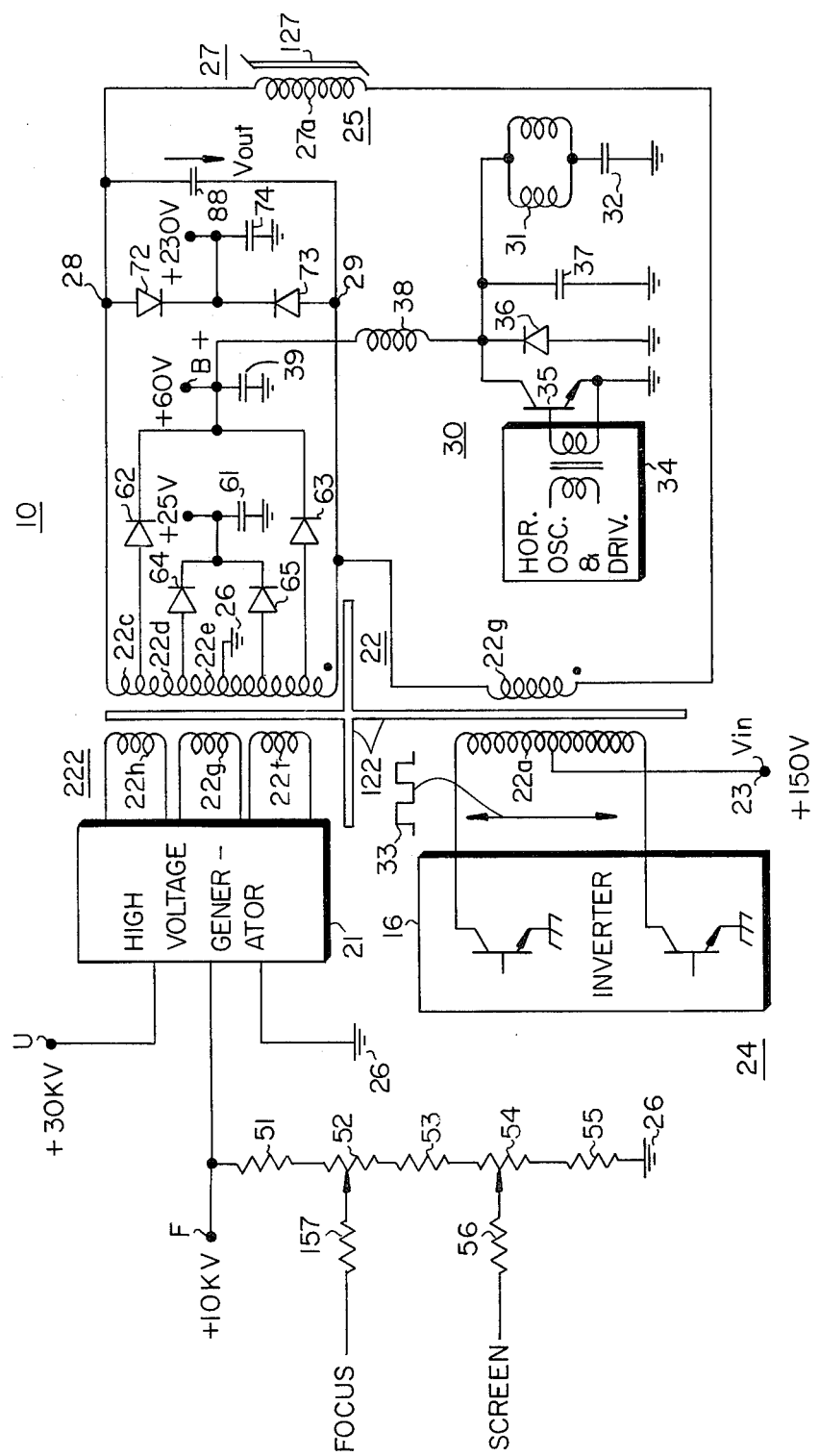
FIG. 1 illustrates a television display system deflection circuit and a power supply therefor that includes a high voltage generator embodying the invention.

In FIG. 1, a power supply 10 for a television receiver or television display system includes a source of alternating voltage 24 and a high leakage inductance power transformer 22. Alternating voltage source 24 comprises a source of direct input voltage, Vin, developing illustratively +150 volts at an input terminal 23, and a high frequency inverter 16 coupled to the primary winding 22a of power transformer 22. Input terminal 23 is coupled to a center tap of primary winding 22a.

Inverter 16 is operated at a relatively high frequency, such as the horizontal deflection frequency of illustratively 15.75 KHz, to develop across primary winding 22a a square or rectangular wave voltage 33 of substantially fifty percent duty cycle. Square-wave voltage 33, when applied to primary winding 22a, develops an alternating polarity voltage across each of secondary output windings 22c–22e of transformer 22. Secondary windings 22c–22e have a common chassis ground center tap 26.

The alternating polarity output voltage developed across winding 22c is full-wave rectified by diodes 72 and 73 and filtered by a capacitor 74 to develop a direct supply voltage, of illustratively +230 volts, to power such circuits as the television receiver picture tube driver circuits. The alternating polarity output voltage developed across winding 22e is full-wave rectified by diodes 64 and 65 and filtered by a capacitor 61 to develop a direct supply voltage, of illustratively +25 volts, to power such television receiver circuits as the vertical deflection circuit and the audio circuit.

The alternating polarity output voltage developed across winding 22d is full-wave rectified by diode 62 and 63 and filtered by a capacitor 39 to develop, at a B+ terminal, a B+ scan supply voltage to energize a horizontal deflection generator circuit 30. Horizontal deflection circuit 30 comprises a horizontal oscillator and driver 34, a horizontal output transistor 35, a damper diode 36, a retrace capacitor 37 and an S-shaping or trace capacitor 32 coupled in series with a horizontal deflection winding 31 across horizontal output transistor 35. Horizontal deflection generator 30 is coupled to the B+ terminal through an inductor 38 and develops a horizontal scanning current in horizontal deflection winding 31.

The alternating polarity output voltage Vout developed across secondary output winding 22c, between terminals 28 and 29, is regulated by the ferroresonant operation in a ferroresonant load circuit 25, as described in two U.S. patent applications of D. H. Willis, U.S. patent application Ser. No. 220,847, filed Dec. 29, 1980, entitled "TELEVISION RECEIVER FERRORESONANT POWER SUPPLY", and U.S. patent application Ser. No. 255,396, filed Apr. 20, 1981, entitled "TELEVISION RECEIVER FERRORESONANT LOAD POWER SUPPLY WITH REDUCED SATURABLE REACTOR CIRCULATING CURRENT", now U.S. Pat. No. 4,353,014, both applications herein incorporated by reference. Ferroresonant load circuit 25 comprises a saturable reactor including a magnetizable core 127 and a winding 27a located thereon, a capacitor 88 coupled between terminals 28 and 29, and a winding 22g of transformer 22, magnetically tightly coupled to winding 22a and conductively coupled in series with saturable reactor winding 27a across capacitor 88.

By being coupled to transformer secondary output winding 22c, ferroresonant load circuit 25 acts as a regulating load circuit to maintain the voltage across winding 22c as the regulated voltage Vout. With the voltage across secondary winding 22c being regulated, the output voltages across all the other secondary windings that are tightly coupled to winding 22c are also regulated. Because of the loose magnetic coupling between primary winding 22a and the secondary output windings, the voltage across the secondary windings can remain relatively unchanged in amplitude or half-cycle area, even though the voltage across the primary winding varies in amplitude.

A tertiary or high voltage secondary winding unit 222 of transformer 22 is coupled to a high voltage generator 21 embodying the invention to develop direct high voltages for various electrodes, not illustrated, of the television receiver picture tube. High voltage generator 21 develops an ultor accelerating potential at a terminal U of illustratively +30 kilovolts and an intermediate direct voltage of +10 kilovolts at an intermediate voltage terminal F. A voltage divider comprising resistors 51–55 is coupled between intermediate terminal F and the chassis ground reference terminal 26. The voltage for the focus electrode is taken from the wiper arm of resistor 52 and applied to that electrode through a resistor 157. The voltage for the screen electrode is taken from resistor 54 and applied to that electrode through a resistor 56.

Figure 2:
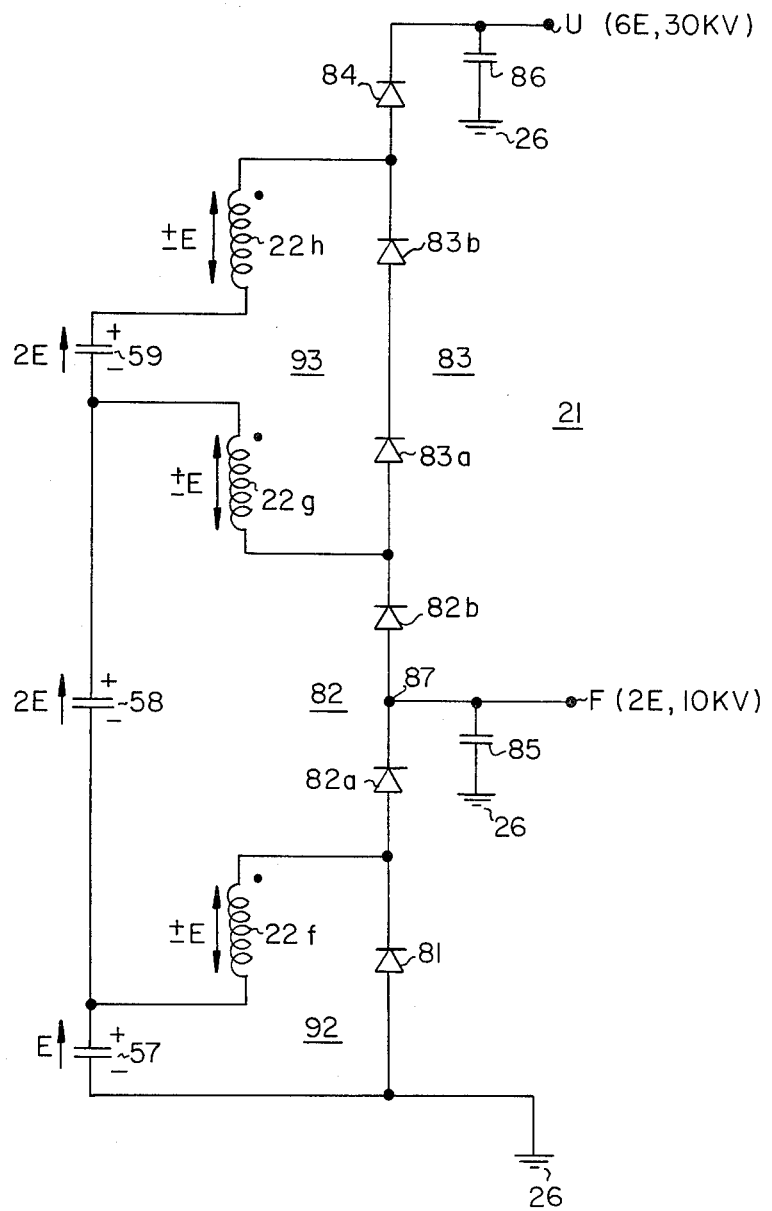
FIG. 2 illustrates a specific embodiment of the high voltage generator of FIG. 1.

High voltage tertiary winding unit 222 comprises three high voltage winding sections 22f–22h, with all the sections having approximately the same number of turns. To develop the ultor accelerating potential between terminal U and ground reference terminal 26, and to develop the intermediate direct voltage between terminal F and ground terminal 26, high voltage winding sections 22f–22h are coupled to two voltage doubler circuits 92 and 93, as illustrated in FIG. 2.

The first voltage doubler 92 is coupled to high voltage secondary winding 22f and comprises a first rectifier, rectifier 81, having an anode electrode coupled to ground reference terminal 26 and a cathode electrode coupled to the dotted terminal of winding 22f, a capacitor 57 coupled between ground reference terminal 26 and the undotted terminal of winding 22f, and a second rectifier, a diode 82a of a rectifier unit 82, having an anode electrode coupled to the dotted terminal of winding 22f and having a cathode electrode, the output terminal of the voltage doubler, coupled to a junction terminal 87.

The second voltage doubler 93 is coupled to a second high voltage secondary winding comprising winding sections 22g and 22h. Voltage doubler 93 comprises diodes 83a and 83b forming a first rectifier unit 83 of the voltage doubler, a capacitor 59 interposed between the dotted end terminal of winding section 22g, and the undotted end terminal of winding section 22h, and a second rectifier 84 of the voltage doubler having an anode electrode coupled to the dotted terminal of winding section 22h, and having a cathode electrode, the output terminal of the voltage doubler, coupled to ultor terminal U.

The cathode electrode of diode 82a is coupled to the intermediate direct voltage terminal F at the junction terminal 87 and is coupled to the anode electrode of diode 83a through diode 82b. A third capacitance, capacitor 58, is coupled between the undotted terminal of winding section 22f of the first voltage doubler 92 and the dotted terminal of winding section 22g of the second voltage doubler 93.

In operation, the substantially fifty percent duty cycle, alternating polarity square-wave voltage 33 of FIG. 1 applied to primary winding 22a of high leakage transformer 22 produces a substantially fifty percent duty cycle, alternating polarity output voltage across each of the low voltage secondary windings 22c–22e and each of the high voltage secondary windings 22f–22h. The voltage developed across each of the high voltage secondary winding sections 22f–22h is somewhat rounded in waveshape due to the operation of ferroresonant load circuit 25, coupled to seondary winding 22c, but is still of substantially fifty percent duty cycle. The positive and negative amplitudes of the voltage are ±E.

In FIG. 2, voltage doubler 92 rectifies the alternating polarity voltage developed across high voltage secondary winding 22f during both polarity intervals to produce a first direct voltage at intermediate voltage terminal F of magnitude 2E. A filter capacitance 85 is coupled between terminal F and ground terminal 26. This capacitance may be either discrete or distributed. The second voltage doubler 93 rectifies the alternating polarity voltage developed across high voltage secondary winding sections 22g and 22h, also during both polarity intervals. When rectifier 84 is conducting, a second direct voltage of magnitude 4E is produced between the cathode of diode 84 and the anode of diode 83a.

Because of the substantially simultaneous conduction of rectifiers 82 and 84, the first direct voltage produced by voltage doubler 92 is combined or added to the second direct voltage produced by voltage doubler 93 to produce at ultor terminal U the ultor accelerating potential of magnitude 6E. A filter capacitance 86 is coupled between ultor terminal U and ground terminal 26. The plates of filter capacitance 86 may comprise the inner and outer conductive coatings deposited on the glass envelope of the television receiver picture tube.

During the polarity interval that the undotted terminals of winding sections 22f–22h are positive relative to the dotted terminals, rectifier 81 of voltage doubler 92 and rectifier 83 of voltage doubler 93 conduct to develop a rectified voltage of magnitude E across capacitor 57 and a rectified voltage of magnitude 2E across capacitor 59 such that the positive plate of capacitor 57 is coupled to the undotted terminal of winding section 22f and the positive plate of capacitor 59 is coupled to the undotted terminal of winding section 22h. Diode 82b is reverse biased and prevents current in winding section 22g from flowing to terminal F.

During the polarity interval that the dotted terminals of winding sections 22f–22h are positive, rectifier 84 and diodes 82a and 82b of rectifier 82 become conductive. The voltage across winding 22f is rectified by diode 82a and added to the voltage across capacitor 57 to produce the intermediate voltage at terminal F. When diodes 82b and 84 conduct, the voltage developed at terminal F is added to the voltage developed across capacitor 59 and to the voltages developed across secondary winding sections 22g and 22h to produce the ultor accelerating potential at terminal U.

When the dotted terminal of winding sections 22f and 22g are positive, capacitor 58 is charged through rectifier 82 to a magnitude 2E, equaling the sum of the magnitudes of the alternating polarity voltages across winding sections 22f and 22g. Capacitor 58 is charged such that its positive plate is coupled to negative plate of capacitor 59 and its negative plate is coupled to the positive plate of capacitor 57. Capacitor 58 provides filtering of the voltage developed between the dotted terminal of winding section 22g of voltage doubler 93 and the undotted terminal of winding section 22f of voltage doubler 92 and, in effect, provides an AC short-circuit between those two terminals. Such filtering may be desirable to tune the two winding sections to a higher resonant frequency when taking leakage inductance and stray capacitance of the two winding sections into account. Capacitor 58 may be omitted or substantially reduced in value relative to the other two capacitors if so desired.

The voltage doubler arrangement of FIG. 2 that develops the ultor accelerating potential, advantageously provides for substantially balanced loading of each of the high voltage secondary winding sections 22f–22h. Appropriate rectifiers coupled to each of the winding sections conduct during both the positive and negative peaks of the AC waveforms developed, producing, in effect, full-wave rectification of these waveforms. The DC flux generated in the core 122 of transformer 22 is significantly reduced.

FIG. 3 illustrates in cross-section the construction of a high voltage assembly 89 that includes secondary output windings 22c–22e and the tertiary winding unit comprising high voltage secondary winding sections 22f–22h. Secondary windings 22c–22e are illustratively layer wound around a portion or one leg of the magnetizable core 122 of power transformer 22 of FIG. 1. Not illustrated in FIG. 3 is primary winding 22a, which is wound around a different portion of core 122.

Situated around layer wound secondary windings 22c–22e is an insulating, plastic bobbin 80. Twelve slots or grooves 92 are formed in bobbin 80 and are arranged in three groups of four slots each. Each of the high voltage secondary winding sections 22f–22h comprises a group of four winding subunits 91. Each of the subunits 91 is randomly wound in a corresponding slot 92 of bobbin 80 with a start-end lead located near the bottom layer of a subunit and a finish-end lead near the top layer of a subunit. The winding sections 22f–22h are wound longitudinally around the common leg of core 122 such that winding section 22f is interposed between winding sections 22g and 22h. The winding direction of section 22h around core 122 is reverse that of the other two sections 22f and 22g.

The electrical connection of the start and finish leads to the twelve winding sub-units 91 to one another and to the various rectifiers and capacitors of high voltage generator 21 is illustrated in the electrical schematic of FIG. 4. The electrical connections of the circuit of FIG. 4 are identical to those of the circuit of FIG. 2. The elements of FIG. 4, however, have been rearranged so as to illustrate the placement of high voltage winding section 22f between high voltage winding sections 22g and 22h.

Capacitors 57–59 of FIG. 4 present near short circuit impedances to the alternating currents flowing in winding sections 22f–22h at the high frequency of operation of inverter 16 of FIG. 1. Thus, the start-end lead of interposed winding section 22f is at the substantially same AC potential as the finish-end lead of winding section 22g and at the same AC potential as the start-end lead of winding section 22h. The interposition of winding section 22f between winding sections 22g and 22h therefore permits the AC voltage stress between end leads of two adjacent winding sections to be relatively small. For example, the finish-end lead of winding section 22g, that is, the finish lead of the fourth winding subunit 91 of section 22g, is located adjacent the finish lead of the first winding subunit of section 22f. The peak AC voltage developed between these two leads is therefore equal to only E/4. Furthermore, because the start-end leads of adjacent winding sections 22f and 22h are coupled together through capacitors 58 and 59, they are at the same potential. Therefore, the finish-end leads of the two winding sections 22f and 22h are also at a common AC potential, and very little AC voltage stress exists between the two finish-end leads.

Rectifier unit 83 is illustrated in FIG. 2 as comprising two individual diodes 83a and 83b. The peak inverse voltage between the cathode of diode 83b and the anode of diode 83a occurs when the dotted terminals of winding sections 22g and 22h are positive. This inverse voltage equals 4E. Because rectifier unit 83 comprises two diodes, the peak inverse voltage across any one diode is halved to 2E, the same inverse voltage that is developed across the diodes of the other rectifiers of FIG. 2. Each diode of FIG. 2 comprises a plurality of pn junctions stacked in series. Thus, for example, the number of pn junctions between the anode and cathode electrodes of diode 81 may be 20 or 22, thereby reducing the inverse voltage stress across any one pn junction.

Figure 5:
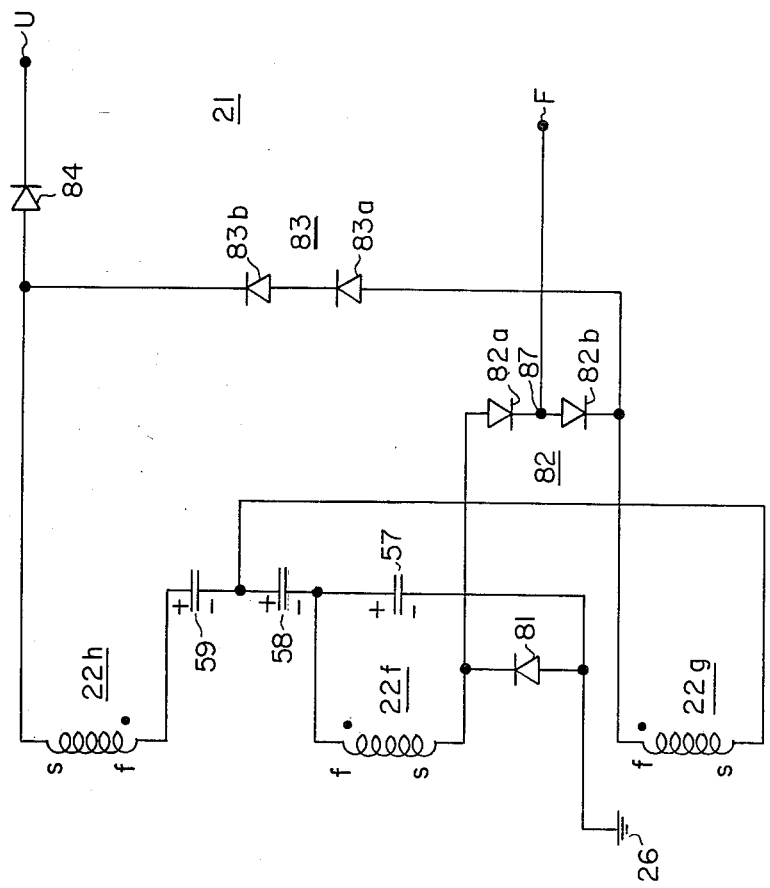
FIG. 5 illustrates an alternate embodiment of the high voltage generator of FIG. 1.

FIG. 5 illustrates an alternate arrangement of high voltage generator 21 that contains the same elements as high voltage generator 21 of FIG. 2, with commonly identified elements in the two figures functioning in an identical manner to produce an ultor voltage of magnitude 6E at terminal U and an intermediate direct voltage of magnitude 2E at terminal F. In FIG. 5, however, the connections of rectifiers 81–84 to the high voltage secondary winding sections 22f–22h are such as to produce conduction of rectifiers 82 and 84 during the polarity interval that the undotted terminals of the winding sections are positive relative to the dotted terminals.

As a specific example of selected circuit values in the circuit of FIG. 2, each high voltage secondary winding section 22f–22h contains 1220 turns, with 7.78 volts peak-to-peak per turn being produced. Capacitors 57–59 are each 500 picofarads in value. The ultor accelerating potential produced at terminal U relative to ground terminal 26 is 28.5 kilovolts. The intermediate direct voltage produced at terminal F relative to ground terminal 26 is 9.5 kilovolts. Capacitor 86 represents a total capacitance of 0.002 microfarads, and capacitor 85 represents a total capacitance of 20 picofarads.

What is claimed is:

1. In a television display system having a picture tube that requires an ultor accelerating potential and an intermediate direct voltage, a high voltage generator for developing the two voltages, comprising:
   a source of alternating voltage;
   a transformer including a primary winding and first and second high voltage secondary windings, said primary winding being coupled to said source for developing an alternating polarity voltage across each of the two high voltage secondary windings;
   an ultor terminal, an intermediate voltage terminal and a reference terminal;
   a first voltage doubler coupled to said first high voltage winding for rectifying the alternating polarity voltage developed across said first high voltage winding during both polarity intervals thereof to produce a first direct voltage, said first direct voltage being applied to said intermediate voltage terminal to generate said picture tube intermediate direct voltage between said intermediate voltage terminal and said reference terminal; and
   a second voltage doubler coupled to said second high voltage winding for rectifyig the alternating polarity voltage developed across said second high voltage winding during both polarity intervals thereof to produce a second direct voltage, said first and second direct voltages being combined and applied to said ultor terminal to generate said picture tube ultor accelerating potential between said ultor terminal and said reference terminal.

2. A high voltage generator according to claim 1 wherein said intermediate direct voltage is a focus voltage of magnitude suitable for application to a focus electrode of said picture tube.

3. A high voltage generator according to claim 1 wherein said source of alternating voltage produces a substantially fifty percent duty-cycle alternating voltage.

4. A high voltage generator according to claim 3 wherein said source of alternating voltage produces a substantially rectangular wave voltage waveform.

5. In a television display system having a picture tube that requires an ultor accelerating potential and an intermediate direct voltage, a high voltage generator for developing the two voltages, comprising:
   a source of alternating voltage;
   a transformer including a primary winding and first and second high voltage secondary windings, said primary winding being coupled to said source for developing an alternating polarity voltage across each of the two high voltage secondary windings;
   an ultor terminal, an intermediate voltage terminal and a reference terminal;
   a first voltage doubler coupled to said first high voltage winding for rectifying the alternating polarity voltage developed across said first high voltage winding during both polarity intervals thereof to produce a first direct voltage, said first direct voltage being applied to said intermediate voltage terminal to generate said picture tube intermediate direct voltage between said intermediate voltage terminal and said reference terminal; and
   a second voltage doubler coupled to said second high voltage winding for rectifying the alternating polarity voltage developed across said second high voltage winding during both polarity intervals thereof to produce a second direct voltage, said first and second direct voltages being combined and applied to said ultor terminal to generate said picture tube ultor accelerating potential between said ultor terminal and said reference terminal, wherein each of said two voltage doublers includes a first rectifier coupled to a respective high voltage secondary winding, a capacitance coupled to said first rectifier for developing across said capacitance during a respective first polarity interval a rectified voltage from the alternating polarity voltage developed across the respective high voltage secondary winding, and a second rectifier coupled to one of said capacitance and respective high voltage secondary winding for rectifying the alternating polarity voltage developed across the respective high voltage secondary winding during the respective other polarity interval and adding the rectified voltage to the voltage developed across said capacitance.

6. A high voltage generator according to claim 5 wherein the output terminal of the second rectifier of the first voltage doubler is coupled to said intermediate voltage terminal and the output terminal of the second rectifier of the second voltage doubler is coupled to said ultor terminal.

7. A high voltage generator according to claim 5 wherein one of the anode and cathode electrodes of the second rectifier of the first voltage doubler is coupled to the other type electrode of the first rectifier of the second voltage doubler.

8. A high voltage generator according to claim 7 wherein said intermediate voltage terminal is coupled at a junction terminal to said one electrode of the second rectifier of the first voltage doubler and to the other type electrode of the first rectifier of the second voltage doubler.

9. A high voltage generator according to claim 5 wherein the cathode electrode of the second rectifier of the first voltage doubler is coupled to the end terminal of the second high voltage winding that is at a low AC potential relative to the other end terminal when said second rectifier of the first voltage doubler is conducting.

10. A high voltage generator according to claim 5 wherein said second high voltage secondary winding comprises first and second winding sections with the capacitance of the second voltage doubler being interposed between an end terminal of the first winding section and an end terminal of the second winding section.

11. A high voltage generator according to claim 10 wherein the other end terminal of the second winding section of the second high voltage winding is coupled to the second rectifier of the second voltage doubler and wherein the other end terminal of the first winding section is coupled to the second rectifier of the first voltage doubler.

12. A high voltage generator according to claim 10 including a capacitance interposed between one of the positive and negative plates of the capacitance of the first voltage doubler and the other type plate of the capacitance of the second voltage doubler.

13. A high voltage generator according to claim 5 wherein said second high voltage secondary winding comprises first and second winding sections and including a third capacitance coupled to said first winding section of said second high voltage secondary winding and to said first high voltage secondary winding, said second rectifier of said first voltage doubler rectifying the voltage developed across the two windings coupled to said third capacitance to produce across said third capacitance the sum of the voltages developed across these two windings.

14. A high voltage generator according to claim 13 wherein said second rectifier of said first voltage doubler is coupled between a start lead of one of said first high voltage secondary winding and said first winding section of said second high voltage secondary winding and a finish lead of the other one.

15. A high voltage generator according to claim 14 wherein said high capacitance is interposed between one of the positive and negative plates of the capacitance of the first voltage doubler and the other type plate of the capacitance of the second voltage doubler.

16. In a television display system having a picture tube that requires an ultor accelerating potential and an intermediate direct voltage, a high voltage generator for developing the two voltages, comprising:
a source of alternating voltage;
a transformer including a primary winding, first and second high voltage secondary windings and a magnetizable core, with the primary and two high voltage secondary windings being wound around portions of said core and wherein one of the two high voltage secondary windings comprises first and second winding sections that together with the other high voltage secondary winding are bound longitudinally around a common leg of said core such that said other high voltage secondary winding is interposed between said first and second winding sections, said primary winding being coupled to said source for developing an alternating polarity voltage across each of the two high voltage secondary windings;
an ultor terminal, an intermediate voltage terminal and a reference terminal;
a first voltage doubler coupled to said first high voltage winding for rectifying the alternating polarity voltage developed across said first high voltage winding during both polarity intervals thereof to produce a first direct voltage, said first direct voltage being applied to said intermediate voltage terminal to generate said picture tube intermediate direct voltage between said intermediate voltage terminal and said reference terminal; and
a second voltage doubler coupled to said second high voltage winding for rectifying the alternating polarity voltage developed across said second high voltage winding during both polarity intervals thereof to produce a second direct voltage, said first and second direct voltages being combined and applied to said ultor terminal to generate said picture tube ultor accelerating potential between said ultor terminal and said reference terminal.

17. A high voltage generator according to claim 16 wherein each of the two end leads of the interposed high voltage secondary winding is located near a corresponding end lead of a respective one of the first and second winding sections that is at the same AC potential as that of the corresponding end lead of the interposed high voltage secondary winding.

* * * * *

UNITED STATES PATENT AND TRADEMARK OFFICE
CERTIFICATE OF CORRECTION

PATENT NO. : 4,394,722

DATED : July 19, 1983

INVENTOR(S) : Leroy William Nero

It is certified that error appears in the above-identified patent and that said Letters Patent is hereby corrected as shown below:

Column 3, Line 53
  That portion reading "in" should read -- of --

Column 10, Line 6
  That portion reading "high" should read -- third --

Column 10, Line 23
  That portion reading "bound" should read -- wound --

Signed and Sealed this

Twentieth Day of September 1983

[SEAL]

Attest:

GERALD J. MOSSINGHOFF

Attesting Officer

Commissioner of Patents and Trademarks